United States Patent
Satoh et al.

(10) Patent No.: US 8,250,545 B2
(45) Date of Patent: Aug. 21, 2012

(54) ASSOCIATED APPARATUS AND METHOD FOR SUPPORTING DEVELOPMENT OF SEMICONDUCTOR DEVICE

(75) Inventors: Tetsuya Satoh, Kanagawa (JP); Masami Iwamoto, Kanagawa (JP); Seiya Itoh, Kanagawa (JP); Yuichi Ozawa, Kanagawa (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1079 days.

(21) Appl. No.: 10/465,663

(22) Filed: Jun. 20, 2003

(65) Prior Publication Data
US 2003/0237023 A1 Dec. 25, 2003

(30) Foreign Application Priority Data

Jun. 25, 2002 (JP) .............................. 2002-184159

(51) Int. Cl.
*G06F 9/44* (2006.01)
*G06F 9/45* (2006.01)
*G06F 9/455* (2006.01)
(52) U.S. Cl. ......... 717/134; 717/124; 717/138; 716/108
(58) Field of Classification Search .................. None
See application file for complete search history.

(56) References Cited

U.S. PATENT DOCUMENTS

| 4,425,633 | A | * | 1/1984 | Swain ............................ 365/194 |
| 5,493,672 | A | | 2/1996 | Lau et al. |
| 5,613,098 | A | * | 3/1997 | Landau et al. .................. 703/20 |
| 5,838,948 | A | | 11/1998 | Bunza |
| 5,991,533 | A | * | 11/1999 | Sano et al. ...................... 703/28 |
| 6,393,606 | B1 | * | 5/2002 | Davila et al. .................. 717/127 |
| 6,460,131 | B1 | * | 10/2002 | Trimberger ..................... 712/39 |
| 6,487,700 | B1 | * | 11/2002 | Fukushima ....................... 716/4 |
| 6,553,549 | B1 | * | 4/2003 | Gowni et al. .................. 716/108 |
| 6,757,829 | B1 | * | 6/2004 | Laczko et al. ................. 713/187 |
| 6,922,821 | B1 | * | 7/2005 | Nemecek ...................... 716/136 |
| 7,127,692 | B2 | * | 10/2006 | Hamlin ......................... 716/108 |
| 7,185,321 | B1 | * | 2/2007 | Roe et al. ...................... 717/134 |

(Continued)

FOREIGN PATENT DOCUMENTS

JP 05-035534 2/1993

(Continued)

OTHER PUBLICATIONS

Huang et al., Reusable embedded in-circuit emulator, Jan. 2001, 2 pp., <http://delivery.acm.org/10.1145/380000/370252/p33-huang.pdf>.*

(Continued)

*Primary Examiner* — Thuy Dao
(74) *Attorney, Agent, or Firm* — Arent Fox LLP

(57) ABSTRACT

An associated development-support apparatus for a semiconductor device enables highly accurate debugging and verification of operations. An emulator stub acquires event information by using a communication control unit, where the event is generated in a debugger, the event information is generated by a debugger stub according to an event, and transmitted by the debugger stub through a communication network. An emulator control unit analyzes the acquired event information, and controls an emulator according to the analyzed event so as to perform emulation processing which virtually emulates operations of the semiconductor device corresponding to the event based on hardware design information. The emulator stub acquires results of the event which is generated in association with the operations of the semiconductor device virtually emulated by the emulator, and notifies the debugger of the results of the event through the communication network and the debugger stub.

16 Claims, 7 Drawing Sheets

U.S. PATENT DOCUMENTS

| | | | |
|---|---|---|---|
| 7,793,261 B1* | 9/2010 | Edwards et al. | 717/124 |
| 2002/0026304 A1* | 2/2002 | Deao et al. | 703/27 |
| 2002/0059054 A1* | 5/2002 | Bade et al. | 703/20 |
| 2002/0087952 A1* | 7/2002 | Tabe et al. | 717/124 |
| 2002/0100021 A1* | 7/2002 | Hunter et al. | 717/124 |
| 2002/0147968 A1* | 10/2002 | Barrenscheen et al. | 717/134 |
| 2003/0182653 A1* | 9/2003 | Desoli et al. | 717/138 |
| 2004/0226000 A1* | 11/2004 | Finch | 717/114 |

FOREIGN PATENT DOCUMENTS

| | | |
|---|---|---|
| JP | 06-067931 | 3/1994 |
| JP | O6-208482 | 7/1994 |
| JP | 07-056764 | 3/1995 |
| JP | 08-110919 | 4/1996 |
| JP | 09-293002 | 11/1997 |
| JP | 9-293002 A | 11/1997 |
| JP | 2000-250957 | 9/2000 |
| JP | 2001-209556 | 8/2001 |
| JP | 2001-290860 | 10/2001 |

OTHER PUBLICATIONS

Nakamura et al., A fast hardware/software co-verification method for system-on-a-chip by using a C/C++ simulator and FPGA emulator with shared register communication, Jun. 2004, 6 pages, <http://delivery.acm.org/10.1145/1000000/996655/p299-nakamura.pdf>.*

Hirotaka Kawakita, "Technique of Scalable Design in System-on-Chip Generation, Fifth Section, Verification System of PCI Bus (part 1)", Interface, CQ publishing Co., Ltd., Dec. 1, 1997, vol. 23, No. 12, pp. 197 to 203 (CSDB: Domestic technical magazine 1997-00576-015).

Hirotaka Kawakita, "Technique of Scalable Design in System-on-Chip Generation, Sixth Section, Verification System of PCI Bus (part 2)", Interface, CQ publishing Co., Ltd., Jan. 1, 1998, vol. 24, No. 1, pp. 188 to 193 (CSDB: Domestic technical magazine 1997-00882-014).

* cited by examiner

ASSOCIATED APPARATUS AND METHOD FOR SUPPORTING DEVELOPMENT OF SEMICONDUCTOR DEVICE

CROSS-REFERENCE TO RELATED APPLICATIONS

This application is based upon and claims priority of Japanese Patent Application No. 2002-184159, filed on Jun. 25, 2002, the contents being incorporated herein by reference.

BACKGROUND OF THE INVENTION

1) Field of the Invention

The present invention relates to an associated apparatus and a method for supporting development of a semiconductor device. In particular, the present invention relates to an associated apparatus and a method for supporting development of a semiconductor device having a CPU core or an apparatus incorporating such a semiconductor device.

2) Description of the Related Art

Many semiconductor devices (e.g., many integrated circuits (ICs) and application specific integrated circuits (ASICs)) which have been developed in recent years have an system-on-chip (system LSI) architecture in which function blocks of a plurality of electronic circuits are arranged according to use and integrated in a chip. Hereinafter, function blocks of electronic circuits are referred to as cores. In some of ICs or ASICs having a system-on-chip (system LSI) architecture, a CPU (central processing unit) core is provided, and complex analysis processing is performed by a program in the CPU core.

In order to support development of a semiconductor device (i.e., a system LSI such as an IC or ASIC) having a CPU core as described above or an apparatus which includes such a semiconductor device (system LSI) as a part of the apparatus, verification of operations, evaluation of performance, and the like are performed by using an in-circuit emulator, which is a pilot model. Hereinafter, an in-circuit emulator is referred to as an ICE.

However, the conventional methods and apparatuses for supporting development of a system LSI cannot perform debugging or verification of operations at accurate timings until a pilot model is produced.

Nevertheless, in the recent LSI development, development and verification of software are required to be performed at the same time as verification of hardware in order to reduce development times of system LSIs. Therefore, conventionally, debugging and verification of operations are performed based on a virtual IC model until hardware verification and production of a pilot model are completed. For example, in conventional development of software embedded in a system LSI, an ICE which emulates a microprocessor in a CPU core is connected instead of the microprocessor, and debugging of a program describing operations of the CPU core and analysis and verification of the operations are performed by using the ICE until completion of hardware around the CPU core. In this case, it is possible to emulate operations of the microprocessor. However, for example, it is impossible to emulate signal propagation delay times which are associated with access to memory areas, register areas in the circuit, and the like by the microprocessor.

Since emulation is conventionally required to be performed by using a virtual IC model, it is impossible to emulate accurate timings. For example, the signal propagation delay times in emulation become different from the signal propagation delay times in the actual system LSI. Thus, it is impossible to perform debugging and verification of operations based on accurate timings until a pilot model is produced. That is, the entire system LSI cannot be tested until the pilot model is produced. This problem is one of factors which increase the time necessary to complete development. For example, a malfunction may be found after the pilot model is produced.

As explained above, in the conventional methods and apparatuses for supporting development of a semiconductor device, it is difficult to perform verification with high accuracy and efficiency without a pilot model, and this impedes reduction of development times of system LSIs.

SUMMARY OF THE INVENTION

The present invention is made in view of the above problems, and the object of the present invention is to provide a method and an apparatus for supporting development of a semiconductor device, by which timings can be accurately emulated, and debugging and verification of operations can be performed with high accuracy.

In order to accomplish the above object, an associated development support apparatus for a semiconductor device having a CPU core is provided. The associated development support apparatus comprises: a communication control unit which controls communication with an event notification apparatus which is connected to a debugger, where the debugger debugs a computer program that is to be embedded in the semiconductor device or an apparatus incorporating the semiconductor device, and the event notification apparatus generates and transmits event information corresponding to an event generated in the debugger, and notifies the debugger of results of the event; and an emulator control unit which acquires from the communication control unit the event information generated by and transmitted from the event notification apparatus, controls an emulator according to the event, and transmits to the event notification apparatus results of the event associated with operations of the semiconductor device emulated by the emulator, by using the communication control unit, where the emulator emulates operations of the semiconductor device based on hardware design information defining a circuit thereof.

In addition, in order to accomplish the above object, a development support method executed by an associated development support apparatus for supporting development of a semiconductor device having a CPU core or an apparatus incorporating the semiconductor device is provided, where the associated development support apparatus connects an emulator with a debugger through a predetermined communication line, the emulator emulates operations of the semiconductor device based on hardware design information defining a circuit thereof, and the debugger is used in debugging of a computer program that is to be embedded in the semiconductor device or the apparatus incorporating the semiconductor device. The development support method comprises the steps of: (a) acquiring event information which is generated according to an event generated in the debugger, and transmitted to the associated development support apparatus through the predetermined communication line; (b) analyzing the acquired event information, and controlling the emulator so as to virtually emulate operations of the semiconductor device according to the event based on the hardware design information; and (c) notifying the debugger of results of the event associated with the operations of the semiconductor device which are virtually emulated in step (b).

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained below with reference to drawings.

Figure 1:
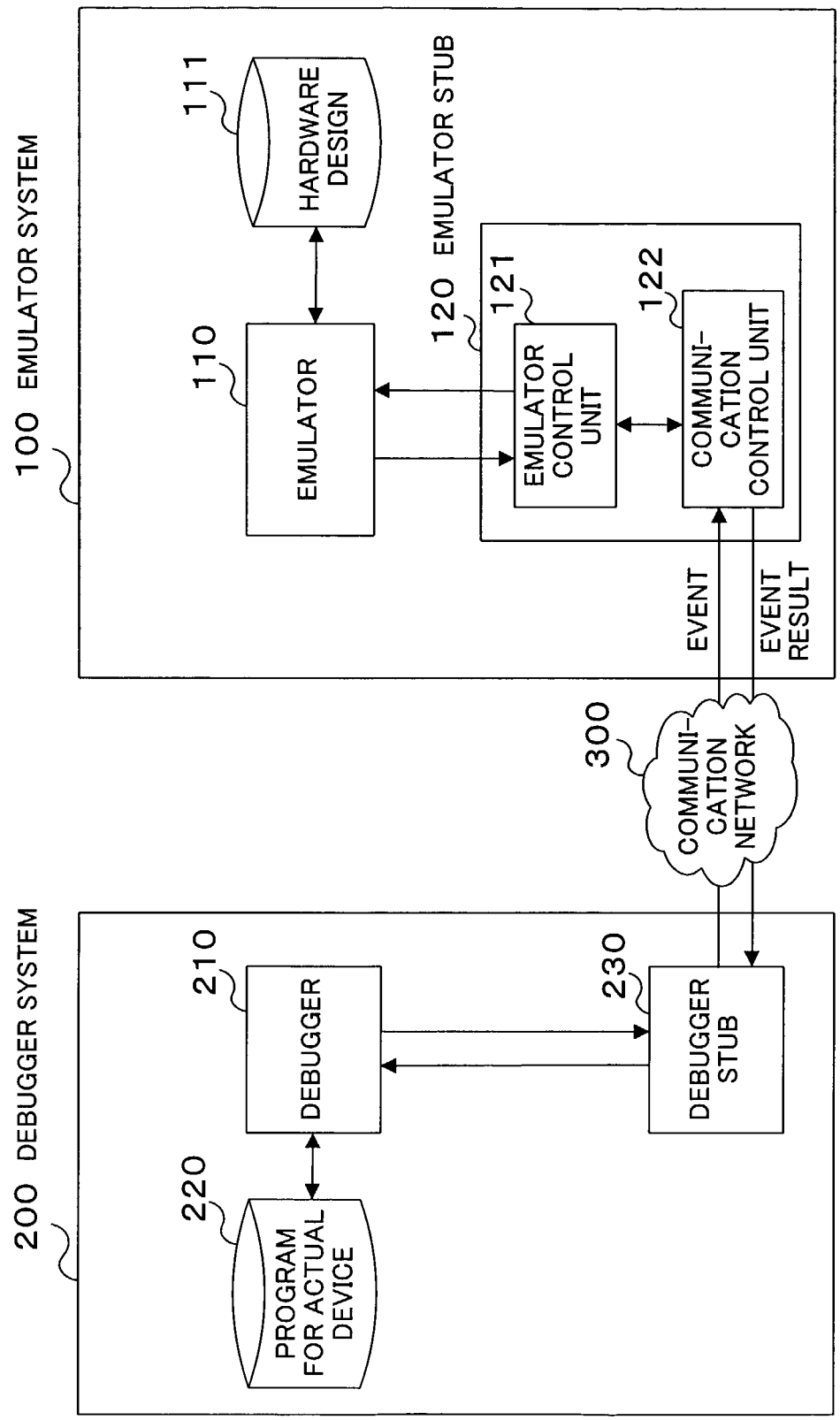
FIG. 1 is a diagram illustrating a construction of a development support system as an embodiment of the present invention, which includes an associated development support apparatus for a semiconductor device.

FIG. 1 is a diagram illustrating a construction of a development support system as an embodiment of the present invention, which includes an associated development support apparatus for a semiconductor device. The development support system of FIG. 1 comprises an emulator system 100 and a debugger system 200. The emulator system 100 is provided for emulation of a semiconductor device based on hardware design information, where the semiconductor device is an object to be developed. The debugger system 200 is provided for debugging at least one computer program for an actual device, where the at least one computer program is embedded in the semiconductor device or in an apparatus incorporating the semiconductor device. The emulator system 100 and the debugger system 200 are interconnected through a communication network 300.

The emulator system 100 comprises an emulator 110, a hardware design 111, and an emulator stub 120. The emulator 110 performs emulation based on the hardware design information. The hardware design 111 is a predetermined recording medium which is readable and writable by the emulator 110. The emulator stub 120 is an associated development support apparatus which receives from a debugger stub 230 a notification of an event which is generated in a debugger 210, and makes the emulator 110 operate in association with the debugger 210.

On the other hand, the debugger system 200 comprises the debugger 210 and the debugger stub 230. The debugger 210 debugs a program recorded in a recording medium 220, which is provided for recording the at least one computer program for the actual device. The debugger stub 230 is an event notification device which notifies the emulator stub 120 of an event which is generated in the debugger 210.

The emulator 110 performs, based on the hardware design information, emulation processing which virtually emulates operations of a specific circuit constituting the semiconductor device and being defined in the hardware design information. Operations of accessing a memory area, a register area, and an internal-node area which are defined by the hardware design information are emulated by accessing virtual areas arranged in the hardware design 111. At this time, signal propagation delay times and the like associated with access to the actual areas can be accurately emulated by signal propagation delay times and the like associated with access to the virtual areas. In addition, when requested, the emulator 110 supplies to the emulator stub 120 various types of timing information based on the hardware design information.

The hardware design 111 is a recording medium which is readable and writable by the emulator 110 and the emulator stub 120, and in which register areas, memory areas, internal-node areas, and program recording areas of the specific circuit defined by the hardware design information are virtually constructed. The settings in the hardware design 111 can be made for each module in the semiconductor device. During development on a module-by-module basis, virtual areas for each module are formed in the hardware design 111 in succession. The hardware design 111 may be arranged in the emulator 110.

The emulator stub 120 is connected to the emulator 110, and is also connected to the debugger stub 230 through the communication network 300. The emulator stub 120 comprises an emulator control unit 121 and a communication control unit 122. The emulator control unit 121 controls the emulator 110 and access to the hardware design 111, and the communication control unit 122 controls communication through the communication network 300.

The emulator control unit 121 analyzes event information acquired from the communication control unit 122, controls operations of the emulator 110 according to an event by using an API (application Program Interface) or the like, and controls access to the hardware design 111. For example, in the case where an event generated in the debugger 210 requests step execution, execution, a forced break, or the like, the emulator control unit 121 controls the emulator 110 so as to emulate operations corresponding to the event. Thus, the emulator 110 virtually emulates operations of the specific circuit when a program is step-executed or when a program is executed up to a certain program address which is set by the debugger 210. At this time, the emulator 110 accurately emulates timings such as signal propagation delay times in the specific circuit based on the hardware design information. In addition, a result of the event such as the status at the time the execution is stopped at each step or by a forced break or the like is transmitted by the communication control unit 122 to the debugger stub 230.

On the other hand, in the case where an event requests a data readout from a virtual area on the hardware design 111, e.g., a readout from a register area, a memory area, or a wire/port, the emulator control unit 121 reads out data from a virtual area designated by the debugger 210, and the readout data is transmitted from the communication control unit 122 to the debugger stub 230.

In addition, in the case where an event requests a data write into a virtual area on the hardware design 111, and the timing of the data write is required to be controlled, e.g., in the case of a data write into a register area or a memory area, the emulator control unit 121 acquires from the emulator 110 timing information relating to the event, and writes data in the virtual area in the hardware design 111 based on the acquired timing information.

The communication control unit 122 is connected to the communication network 300, acquires event information (which is generated according to an event generated in the debugger 210, and transmitted from the debugger stub 230 through the communication network), and passes the event information to the emulator control unit 121. When the communication control unit 122 receives a result of the generated event, the communication control unit 122 sends the result of the event to the debugger stub 230 through the communication network 300. Although only one debugger system 200 is illustrated in FIG. 1, the communication control unit 122 can perform processing for more than one debugger system. In this case, the communication control unit 122 assigns the right of communication to the plurality of debugger stubs connected to the communication control unit 122 through the communication network 300, in a time-sharing manner, and concurrently controls the plurality of debugger stubs.

At least one program stored in the recording medium 220, which is provided for storing programs for an actual device, is loaded in the debugger 210 constituting the debugger system 200, and the debugger 210 generates an event in accordance with a user's instruction which is inputted through a GUI (Graphic User Interface) or the like, where the event requests, for example, execution, step execution, or a forced break of a program, a read/write from/into a memory area, a read/write from/into a register area, or access to an internal node such as an I/O port.

The debugger stub 230 is connected to the debugger 210, and is also connected to the emulator stub 120 through the communication network 300. The debugger stub 230 acquires an event generated in the debugger 210 by using an API, generates event information, transmits the event information to the emulator stub 120, and passes to the debugger 210 a result of the event which is acquired from the emulator stub 120.

Operations of the development support system having the above construction and a development support method are explained below.

A program for an actual device recorded in the recording medium 220 is loaded in the debugger 210, and debugging using the debugger system 200 is started. When the debugging is started, the debugger 210 successively generates events such as execution, step execution, or a forced break of a program, or access to a register area, a memory area, an internal node (e.g., wire or an I/O port), or the like. The debugger stub 230 is notified of each of the generated events, converts the event into event information which can be read by the emulator stub 120, and transmits the event information to the emulator stub 120 through the communication network 300.

The communication control unit 122 in the emulator stub 120 acquires the event information, and passes the event information to the emulator control unit 121. The emulator control unit 121 analyzes the event information, controls the emulator 110 according to the event information, and reads or writes data from or to a virtual area in the hardware design 111 in synchronization with operational timings of the emulator 110.

In the case where the event requests an operation of the semiconductor device or forced stop of an operation of the semiconductor device in accordance with a program, e.g., in the case where the event requests execution, step execution, a forced break, or the like of a program, the emulator control unit 121 controls the emulator 110 so as to emulate operations of the semiconductor device according to the event. At this time, the emulator 110 accurately emulates timings of the specific circuit. In addition, when the execution stops, the emulator control unit 121 acquires the status at the time of the stop (e.g., a normal end or an abnormal end), and transmits the status as a result of the event to the debugger stub 230 through the communication control unit 122.

In the case where the event requests read processing such as a memory read, a register read, an internal-node read, or the like, the emulator control unit 121 reads out data from a corresponding virtual area arranged in the hardware design 111, and the readout data is transmitted as a result of the event through the communication control unit 122 to the debugger stub 230.

Further, in case where the event requests write processing such as a memory write, a register write, or the like, the emulator control unit 121 acquires from the emulator 110 timing information based on the hardware design information, and writes data in a memory area or a register area in accordance with the timing information.

When the debugger stub 230 acquires a result of the event from the emulator stub 120, the debugger stub 230 converts the result of the event into a form which can be read by the debugger 210, and passes the converted result of the event to the debugger 210.

As described above, the emulator stub 120 in the emulator system 100 is notified of each event generated in the debugger system 200, by the debugger stub 230 through the communication network 300. The emulator stub 120 controls the emulator 110 according to the acquired event so as to emulate operations based on the hardware design information. The emulator 110 accurately emulates operational timings of the specific circuit. In addition, it is possible to read or write data from or into a virtual area arranged for a memory area, a register area, or the like in the hardware design 111, in response to the request event from the debugger 210. Thus, the debugger 210 can debug a program which describes operations of the specific circuit, based on timings equivalent to the timings in the pilot model. Further, when the hardware design 111 arranged for each module is connected to the emulator 110, it is possible to perform debugging and verification of operations with high precision even in an early stage of development before completion of hardware design of the entire system. Therefore, the development time of the system LSI can be reduced.

Furthermore, since the emulator system 100 and the debugger system 200 are connected through the communication network 300, development and verification of the hardware design and development and verification of the software can be performed at different locations remote from each other. Moreover, more than one debugger systems can be connected to the emulator system 100.

Figure 2:
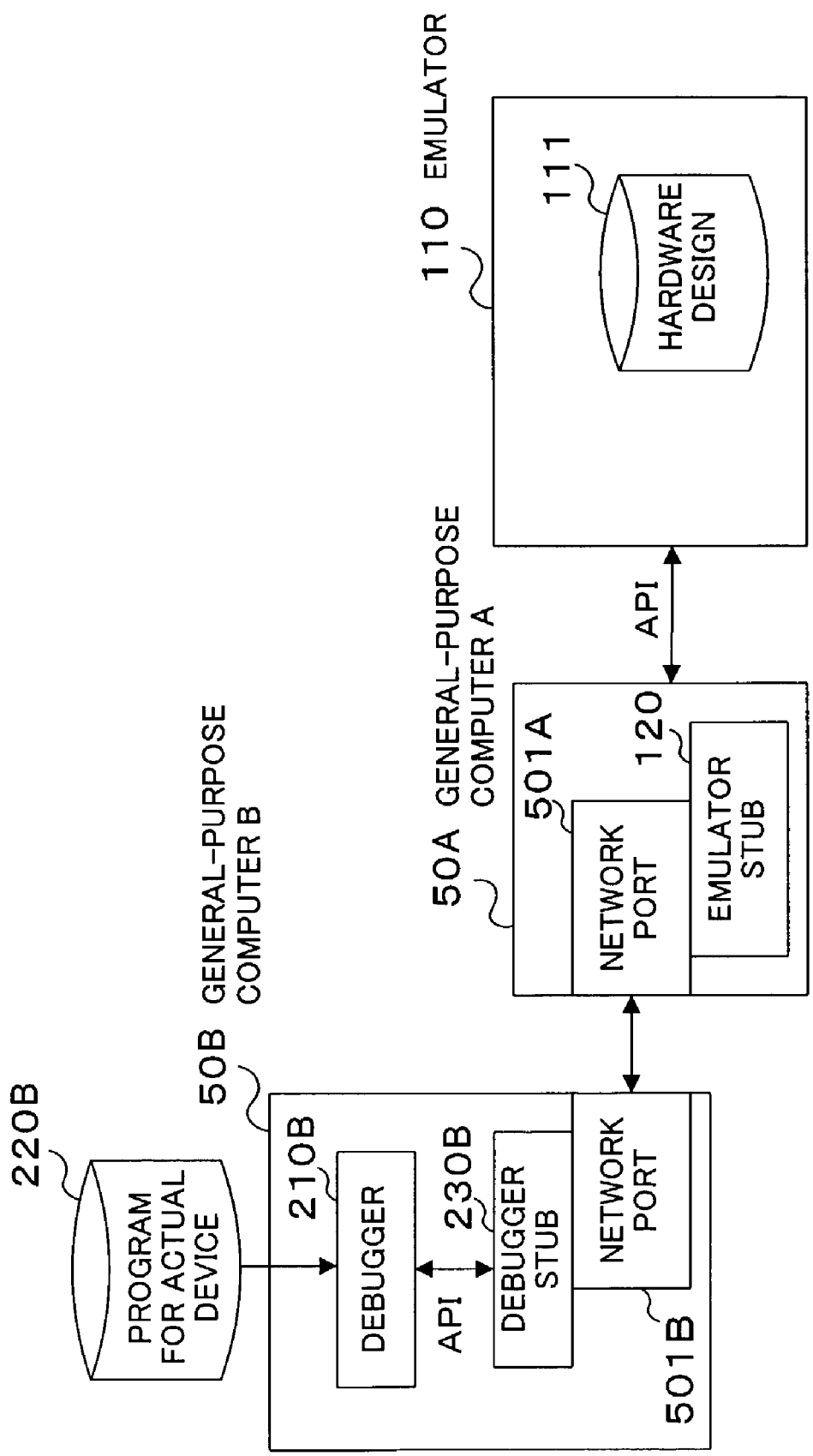
FIG. 2 is a diagram illustrating an exemplary construction of a system in which a development support method as an embodiment of the present invention is realized.

Next, a construction of an embodiment realized by concrete devices is explained. FIG. 2 is a diagram illustrating an exemplary construction of a system in which a development support method as an embodiment of the present invention is realized. In FIG. 2, the same elements as FIG. 1 bear the same reference numbers as FIG. 1, and the explanations of the same elements as FIG. 1 are not repeated.

The development support system according to the present invention is constituted by an emulator 110 performing emulator processing, a general-purpose computer B (50B) having functions of a debugger, and a general-purpose computer A (50A) as an associated development support apparatus which makes the emulator 110 operate in association with processing performed by the general-purpose computer B (50B). The general-purpose computer A (50A) and the general-purpose computer B (50B) are connected through a communication network.

The emulator 110 contains a hardware design 111, and performs emulation of a semiconductor device based on hardware design information.

The general-purpose computer A (50A) has a network port 501A connected to the communication network, and stores a server program for making the general-purpose computer A (50A) behave as an emulator stub 120 which controls execution of the emulator 110. This program is a demon which is started in response to a communication from a debugger stub 230B.

The general-purpose computer B (50B) has a network port 501B connected to the communication network, and stores a program for making the general-purpose computer B (50B) behave as a debugger 210B and a debugger stub 230B.

Operations of the development support system having the above construction and a development support method are explained below.

First, the emulator 110 including the hardware design 111 is started up, and then the emulator stub 120 in the general-purpose computer A (50A) is started up. The emulator stub 120 is started up as a demon, and comes into a state in which the emulator stub 120 waits for a communication from the debugger stub 230B. Subsequently, the debugger 210B in the general-purpose computer B (50B) is started up. At the time as the startup of the debugger 210B, the debugger stub 230B is started up. When the debugger stub 230B is started up, a connection for communication with the emulator stub 120 is established. When the operation for establishing the connection is completed, initialization processing is completed. Thereafter, the emulator stub 120 can be notified of each event generated by the debugger 210B, through the debugger stub 230B. In addition, a firm program, which is a program recorded in a recording medium 220B for an actual device, is loaded in the debugger 210B before debugging is started.

When the initialization processing is completed, the general-purpose computer B (50B) can perform debugging. When debugging is started, and an event requesting a memory read/write, a register read/write, a wire/port read, step execution, execution, a forced break, or the like is generated in the debugger 210B, the debugger stub 230B is started up by using an API, and notified of the occurrence of the event. The debugger stub 230B converts the event of which the debugger stub 230B is notified, into a command which can be read by the emulator stub 120, and transmits the command as event information from the network port 501B to the general-purpose computer A (50A).

When the emulator stub 120 acquires the event information through the network port 501A, the emulator stub 120 controls the emulator 110 and access to the hardware design 111.

When the event generated in the debugger 210B requests execution, a forced break, step execution, or the like of a program, the emulator stub 120 controls operations of the emulator 110 according to the event so as to emulate operations of a specific circuit in the semiconductor device in association with execution of the program up to a predetermined address, or a forced break or step execution of the program. In addition, when execution stops, the emulator stub 120 obtains from the emulator 110 the status (e.g., a normal end, an abnormal end, or the like) at the time of execution, and notifies the debugger stub 230B of the status as a result of the event.

Further, in the case where the event generated in the debugger 210B requests a read operation such as a memory read, a register read, an internal-node read, or the like, the emulator control unit 121 reads out data from a virtual memory area, a virtual register area, or a virtual internal-node area arranged in the hardware design 111, and the readout data is transmitted as a result of the event through the communication control unit 122 to the debugger stub 230B.

Furthermore, in case where the event generated in the debugger 210B requests a write operation such as a memory write, a register write, or the like, the emulator stub 120 acquires from the emulator 110 timing information based on the hardware design information, and controls a data write operation into a virtual area arranged in the hardware design 111 so that the data write operation is appropriately timed. Since the data write operation is appropriately timed, it is possible to prevent production of a race condition by an operation of the specific circuit emulated by the emulator 110 and a write operation performed by the debugger 210B. That is, if a timing of a change in the specific circuit coincides with a timing of a writing operation controlled by the emulator stub 120, the emulator 110 cannot determine which operation has higher priority.

Thereafter, when the debugger stub 230B acquires the result of the event from the emulator stub 120, the debugger stub 230B encodes the result of the event so as to be decodable by the debugger 210B, and passes the encoded result of the event to the debugger 210B.

As described above, when the emulator 110 is controlled so as to operate in association with an event generated in the debugger 210B, verification can be performed with high precision. In addition, since the verification can be performed on a module-by-module basis, it is possible to perform verification in an early stage of development.

Figure 3:
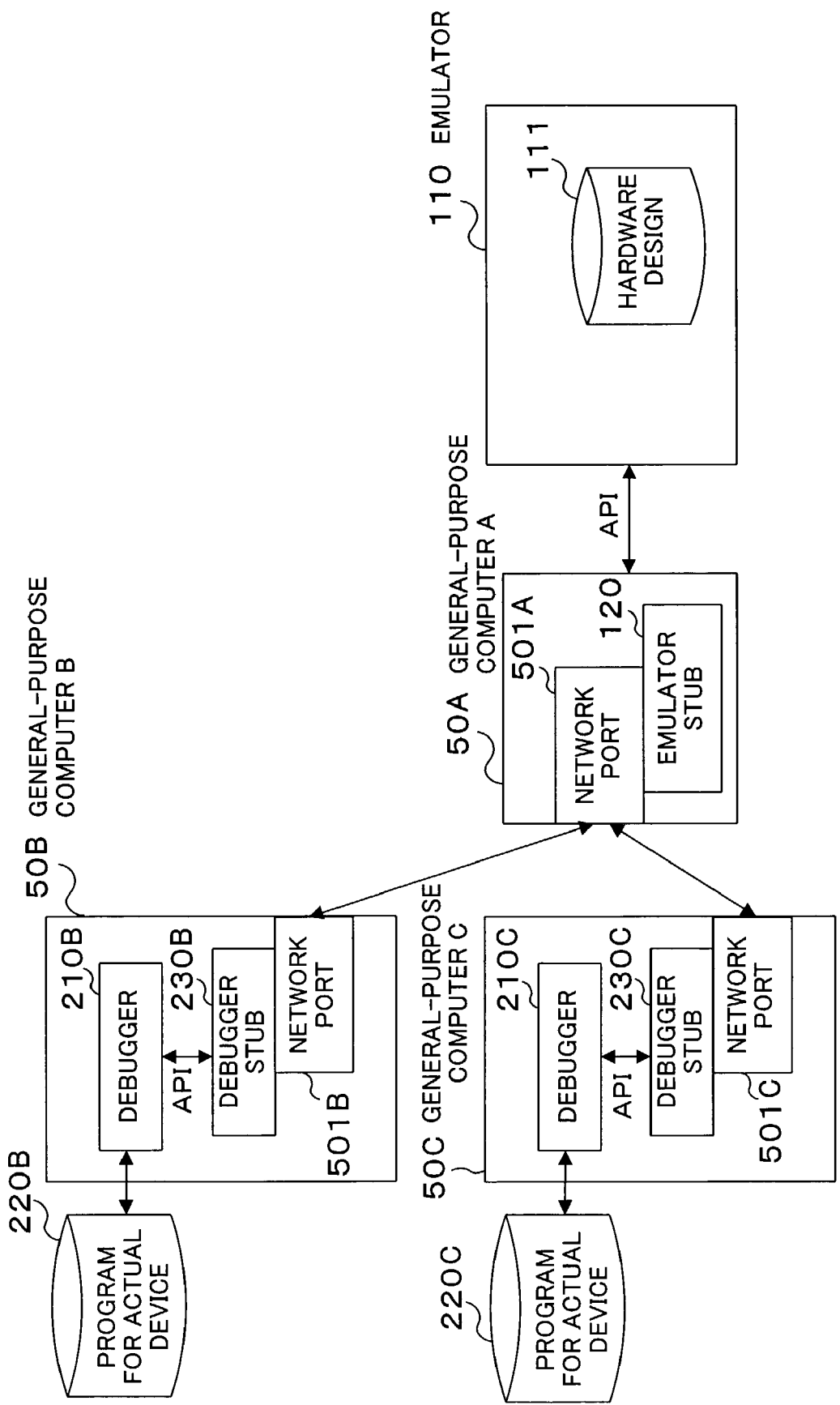
FIG. 3 is a diagram illustrating an exemplary construction of a system comprising a plurality of debuggers as an embodiment of the present invention.

Next, a case where a plurality of debuggers are provided is explained below. FIG. 3 is a diagram illustrating an exemplary construction of a system comprising a plurality of debuggers as an embodiment of the present invention. In FIG. 3, the same elements as FIG. 2 bear the same reference numbers as FIG. 2, and the explanations of the same elements as FIG. 2 are not repeated.

The general-purpose computer C (50C) comprises a debugger 210C, a debugger stub 230C, and a network port 501C, and is connected to an emulator stub 120 through a communication network, where the debugger 210C, the debugger stub 230C, and the network port 501C are respectively equivalent to the corresponding elements in the general-purpose computer B (50B).

Operations of the system of FIG. 3 are explained.

At the time of initialization, the general-purpose computer C (50C) starts up the debugger 210C as in the case of FIG. 2. At the same time as the startup of the debugger 210C, the debugger stub 230C is started up. When the debugger stub 230C is started up, a connection for communication is established between the general-purpose computer C (50C) and the emulator stub 120.

When the operations of initialization are completed, each of the general-purpose computer B (50B) and the general-purpose computer C (50C), both connected to the emulator stub 120, starts a debugging operation. The emulator stub 120 acquires event information from each of the general-purpose computer B (50B) and the general-purpose computer C (50C) by assigning the right of communication to the general-purpose computer B (50B) and the general-purpose computer C (50C) in a time-sharing manner, and performs processing in response to each event corresponding to the acquired event information. That is, the emulator stub 120 assigns the right of communication to the general-purpose computer B (50B) and the general-purpose computer C (50C) in a time-sharing manner, and each of the general-purpose computer B (50B) and the general-purpose computer C (50C) makes notification of an event generated in a corresponding one of the debuggers 210B and 210C when each general-purpose computer acquires the right of communication. Since the operations of the emulator stub 120 and the emulator 110 performed after reception of various types of events are similar to the operations in the embodiment of FIG. 1, the explanations are not repeated. Thus, parallel processing in which each of the debuggers 210B and 210C performs debugging by using the emulator 110 is enabled. That is, it is possible to control the single emulator 110 by the plurality of debuggers 210B and 210C.

Next, operations in a case where an event requesting access to a virtual area occurs in the development support system having the above construction and in the development support method are explained below. In the following explanations, for the purpose of simplicity, a case where the single debugger stub 230B is connected to the emulator stub 120 as illustrated in FIG. 2 is explained.

Figure 4:
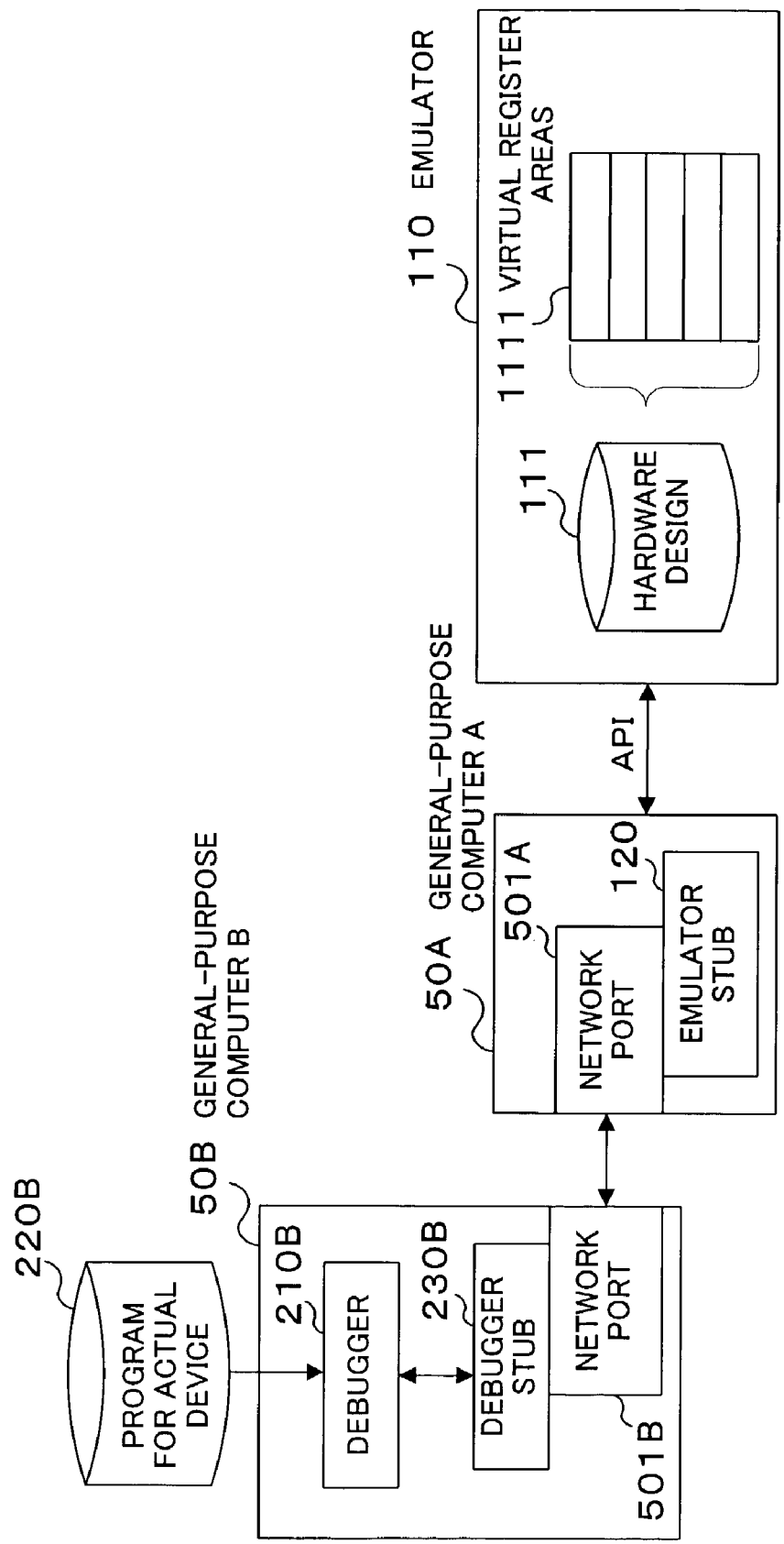
FIG. 4 is a diagram illustrating an access event to a register area in the development support method as an embodiment of the present invention.

First, a case of access to a register area is explained. FIG. 4 is a diagram illustrating an access event to a register area in the development support method as an embodiment of the present invention. In FIG. 4, the same elements as FIG. 2 bear the same reference numbers as FIG. 2, and the explanations of the same elements as FIG. 2 are not repeated.

Based on the hardware design information, virtual register areas 1111 for the specific circuit in the semiconductor device are arranged in the hardware design 111 which is provided in the emulator 110.

When an event requesting a register read is generated in the debugger 210B, the debugger stub 230B is started up, and a command corresponding to the register read is generated and transmitted to the emulator stub 120. When the emulator stub 120 acquires the register read command, the emulator stub 120 reads out, in accordance with the command, data from the virtual register areas 1111 arranged for the specific circuit in the hardware design 111. In addition, the emulator stub 120 sends the readout data as a result of the event to the debugger stub 230B. The debugger stub 230B converts the readout data so as to be decodable by the debugger 210B, and passes the converted data to the debugger 210B. Thus, the register read event generated in the debugger 210B is processed.

Further, when an event requesting a register write is generated in the debugger 210B, the debugger stub 230B is similarly started up, and a command corresponding to the register write is generated and transmitted to the emulator stub 120. When the emulator stub 120 acquires the register write command, the emulator stub 120 controls the emulator 110 so as to write data into the virtual register areas in accordance with the command. In the case of a write operation, the write operation is required to be appropriately timed. Therefore, the emulator stub 120 acquires from the emulator 110 timing information indicating timings of the register areas, and the emulator stub 120 executes the write operation in accordance with the timing information. For example, in the case where a state of a register in the specific circuit defined in the hardware design information changes on the rising edge of a clock signal as in the case of a counter circuit, a write timing signal generated by the emulator stub 120 for a write operation by the debugger 210B should not be changed on the rising edge of the clock signal. In this case, in order to prevent occurrence of a race condition, the timing of the write operation by the debugger 210B is determined to coincide with the falling edge of the clock signal, instead of the rising edge.

Figure 5:
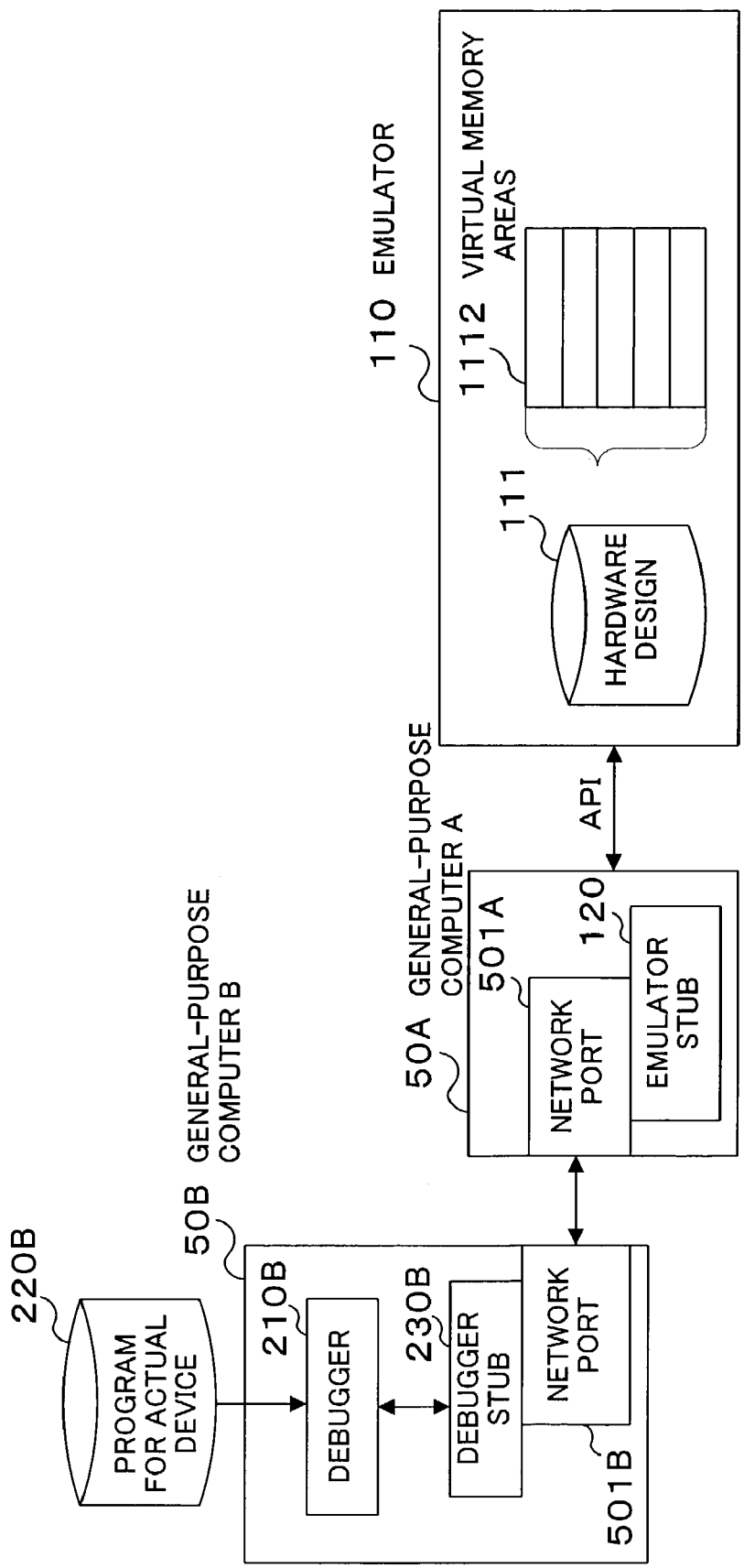
FIG. 5 is a diagram illustrating an access event to a memory area in the development support method as an embodiment of the present invention.

Next, a case of access to a memory area is explained. FIG. 5 is a diagram illustrating an access event to a memory area in the development support method as an embodiment of the present invention. In FIG. 5, the same elements as FIG. 2 bear the same reference numbers as FIG. 2, and the explanations of the same elements as FIG. 2 are not repeated.

Based on the hardware design information, virtual memory areas 1112 for the specific circuit in the semiconductor device based on the hardware design information is virtually arranged in the hardware design 111 which is provided in the emulator 110.

When an event requesting a memory read is generated in the debugger 210B, the debugger stub 230B is started up, and a command corresponding to the memory read is generated. For example, when a user performs manipulation for a memory read from the addresses 0A00h to 0B00h, through a user interface at the debugger 210B, the input event requesting the memory read is converted into a command "READ-MEM 0A00:0B00h," and the command is transmitted to the emulator stub 120. When the emulator stub 120 acquires the memory read command, the emulator stub 120 recognizes that the memory read operation from the address range of "0A00" to "0B00h" is requested. Then, the emulator stub 120 reads out data from the virtual memory areas 1112 arranged in the hardware design 111 for the specific circuit, and sends the readout data to the debugger stub 230B. The debugger stub 230B converts the readout data so as to be decodable by the debugger 210B, and passes the converted data to the debugger 210B. Thus, the memory read event generated in the debugger 210B is processed.

Further, when an event requesting a memory write is generated in the debugger 210B, the debugger stub 230B generates a command corresponding to the memory write, and transmits the command to the emulator stub 120. In the case of the memory write, the write operation is required to be appropriately timed as in the case of the register write. Therefore, the emulator stub 120 acquires from the emulator 110 timing information indicating timings of the write operation into the memory areas, and performs the write operation into the virtual memory areas 1112 in accordance with the timing information.

Figure 6:
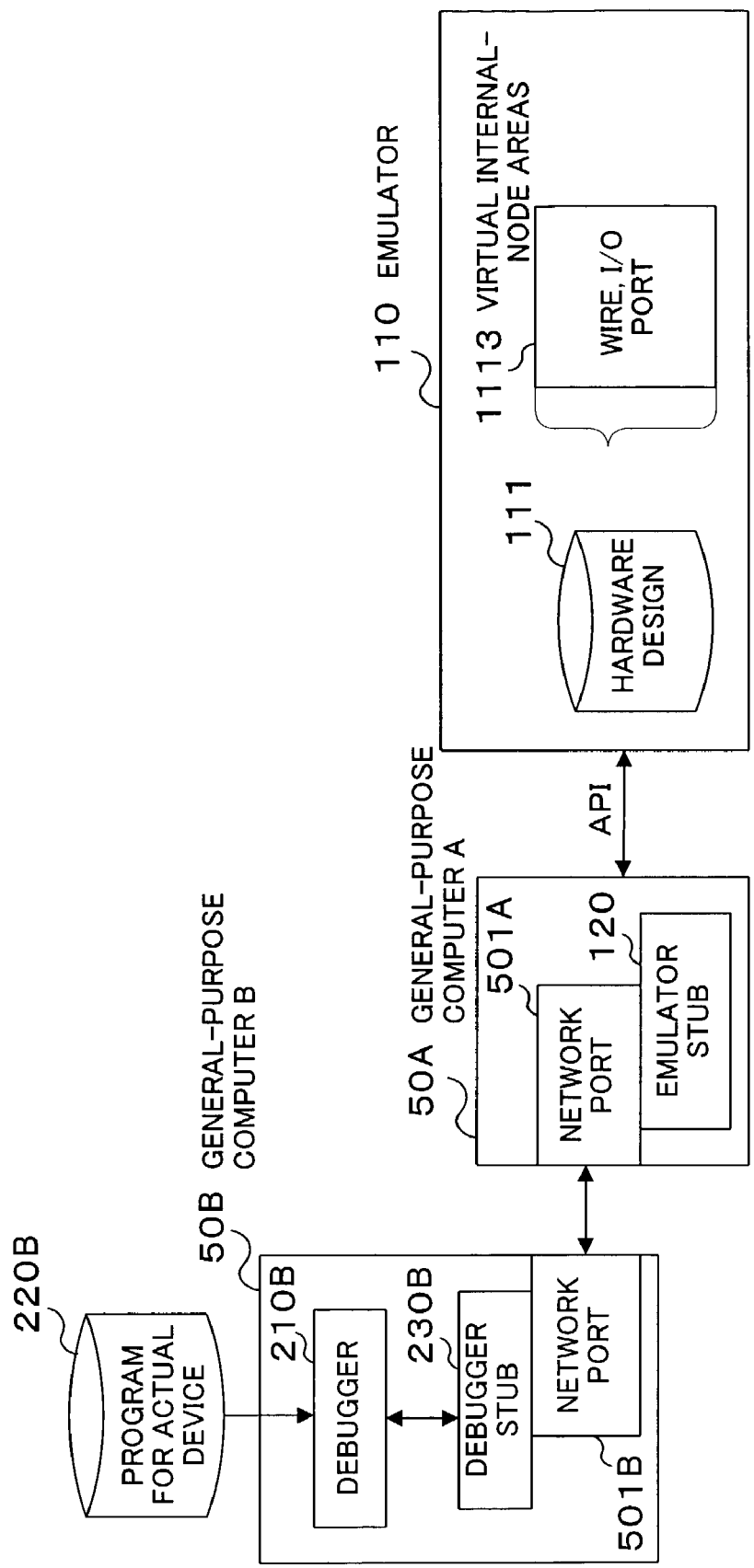
FIG. 6 is a diagram illustrating an access event to an internal-node area in the development support method as an embodiment of the present invention.

Next, a case of access to an internal-node area is explained. FIG. 6 is a diagram illustrating an access event to an internal-node area in the development support method as an embodiment of the present invention. In FIG. 6, the same elements as FIG. 2 bear the same reference numbers as FIG. 2, and the explanations of the same elements as FIG. 2 are not repeated.

Based on the hardware design information, virtual internal-node areas 1113 for the specific circuit in the semiconductor device based on the hardware design information is virtually arranged in the hardware design 111 which is provided in the emulator 110. However, only the readout operations from internal nodes can be performed by the emulator stub 120 on the virtual internal-node areas.

When an event requesting a read from an internal node such as wire or an I/O port is generated in the debugger 210B, the debugger stub 230B generates a command corresponding to the read from the internal node, and transmits the command to the emulator stub 120. When the emulator stub 120 acquires the command to read from the internal node, the emulator stub 120 reads out data from the virtual internal-node areas 1113 arranged in the hardware design 111 for the specific circuit, and sends the readout data as a result of the event to the debugger stub 230B. The debugger stub 230B converts the readout data so as to be decodable by the debugger 210B, and passes the converted data to the debugger 210B. Thus, the event which is generated in the debugger 210B and requests the read from the internal node is processed.

Figure 7:
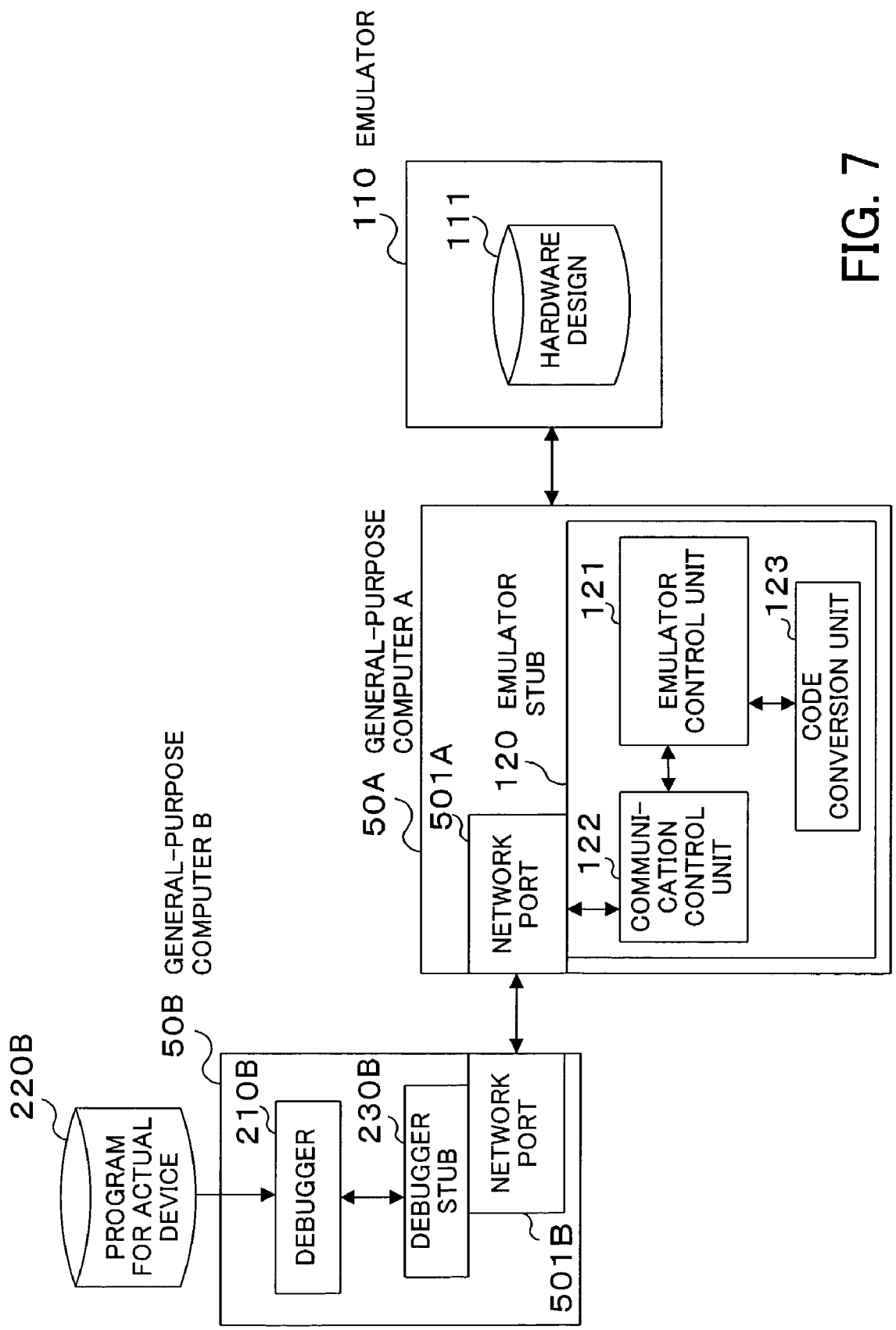
FIG. 7 is a diagram illustrating an instruction-code rewrite event in the development support method as an embodiment of the present invention.

The control of execution of a program and access to virtual areas in the hardware design 111 in the emulator 110, which is performed by the emulator stub 120 in response to an event generated in the debugger 210B, is explained above. Further, operations for rewriting an instruction code in the program are frequently performed during debugging, as well as the processing of the events explained above. According to the present invention, it is possible to reflect an event requesting a rewrite of an instruction code in the emulator 110 when the event is generated in the debugger 210B, in a similar manner to the events explained above. FIG. 7 is a diagram illustrating an instruction-code rewrite event in the development support method as an embodiment of the present invention. In FIG. 7, the same elements as FIG. 2 bear the same reference numbers as FIG. 2, and the explanations of the same elements as FIG. 2 are not repeated.

The program recording areas, in which a program is recorded, are provided in the hardware design 111. The program recorded in the hardware design 111 is converted to mnemonic codes, which can be decoded by a microprocessor.

When an event requesting a change of an instruction code in a program is generated in the debugger 210B, the debugger stub 230B generates a command corresponding to the instruction-code change event, and transmits the command to the emulator stub 120. The change of an instruction code is made on a line-by-line basis in the program, or for each program module recorded in the recording medium 220B, which is provided for storing at least one program for an actual device. When the emulator stub 120 acquires the command corresponding to the instruction-code change event, a code conversion unit 123 converts the instruction code into a mnemonic code. The converted mnemonic code is written in the program recording areas in the hardware design 111 by the emulator control unit 121. When this operation is required to be timed, the emulator control unit 121 acquires from the emulator 110 timing information relating to the write operation into the program recording areas, and performs the write operation in accordance with the timing information.

Although the code conversion unit 123 is arranged in the emulator stub 120 in FIG. 7, alternatively, the code conversion unit 123 may be arranged in the debugger stub 230B.

The above processing functions can be realized by a server computer in a client-server system. In this case, a server program which describes details of processing for realizing the functions which the associated development support apparatus for a semiconductor device should have is provided. The server computer executes the server program in response to a request from a client computer. Thus, the above processing functions can be realized on the server computer, and a processing result is supplied to the client computer.

The server program describing the details of the processing can be stored in a recording medium which can be read by the server computer. The recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile Disc), a DVD-RAM (Random Access Memory), a CD-ROM (Compact Disc Read Only Memory), a CD-R (Recordable)/RW (ReWritable), or the like. The optical magnetic recording medium may be an MO (Magneto-Optical Disc) or the like.

In order to put the server program into the market, for example, it is possible to sell a portable recording medium such as a DVD or a CD-ROM in which the server program is recorded.

The server computer which executes the server program stores the server program in a storage device belonging to the server computer, where the server program is originally recorded in, for example, a portable recording medium. The server computer reads the server program from the storage device, and performs processing in accordance with the server program. Alternatively, the server computer may directly read the server program from the portable recording medium for performing processing in accordance with the server program.

As explained above, according to the present invention, an event generated in a debugger is acquired, operations of a semiconductor device in response to the event are virtually emulated based on hardware design information by controlling an emulator. At this time, a result of the operation is sent to the debugger.

Since operations in response to an event generated in a debugger are virtually emulated based on hardware design information by controlling an emulator, it is possible to emulate an occurring operation at an accurate timing, and construct an environment for development and verification of software which is equivalent to the environment in which a pilot model is used. In addition, it is possible to verify hardware in a state in which a program is installed.

Thus, according to the present invention, it is possible to develop and verify software and hardware in an environment equivalent to the environment in which a pilot model is used, even in an early stage of the development. Therefore, improvement of quality and early commercialization of a system LSI are enabled.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A development support method executed by an associated development support apparatus for supporting development of a semiconductor device having a CPU core or an apparatus incorporating the semiconductor device, where the associated development support apparatus connects an emulator with a debugger through a predetermined communication line, the development support method comprising:

acquiring event information which is generated in the debugger that debugs a computer program that is to be embedded in the semiconductor device or an apparatus incorporating the semiconductor device;

transmitting to the associated development support apparatus through the predetermined communication line;

analyzing the acquired event information, and controlling the emulator so as to emulate operations of the semiconductor device in accurate timings of a specific circuit according to the event information based on a hardware design information, stored in a memory, defining a hardware design of the specific circuit and a timing of a signal of the specific circuit; and notifying the debugger of emulated results of the event associated with the operations of the semiconductor device;

wherein the transmitting writes data according to the event information into a memory area in the emulator at a first timing from outside of the emulator, the first timing being different from a second timing of writing data into the memory area by the emulator, the first timing and the second timing synchronizing with a rising edge or a falling edge of a clock signal.

2. An associated development support apparatus for a semiconductor device having a central processing unit (CPU) core, comprising:
a CPU;
a memory which stores hardware design information defining a hardware design of a specific circuit and a timing of a signal of the specific circuit;
a communication control unit which controls communication with a debugger, which debugs a computer program that is to be embedded in the semiconductor device or an apparatus incorporating the semiconductor device, and transmits event information generated in the debugger, and notifies the debugger of results of the event;
an emulator which emulates operations of the semiconductor device in accurate timings of the specific circuit based on the hardware design information; and
an emulator control unit which acquires from the communication control unit the event information, controls the emulator according to the event information, and transmits to the debugger results of the event associated with operations of the semiconductor device emulated by the emulator;
wherein the emulator control unit writes data according to the event information into a memory area in the emulator at a first timing from outside of the emulator, the first timing being different from a second timing of writing data into the memory area by the emulator, the first timing and the second timing synchronizing with a rising edge or a falling edge of a clock signal.

3. The associated development support apparatus according to claim 2, wherein the communication control unit is connected to at least one event notification apparatus through a predetermined communication line, assigns a right of communication to the at least one event notification apparatus in a time-sharing manner, and acquires event information generates by each of the at least one event notification apparatus, where at least one event notification apparatus is connected to the debugger.

4. The associated development support apparatus according to claim 2, wherein the emulator control unit generates a readout signal for a readout operation from a virtual area according to an event which is recognized based on analysis of the event information, when the virtual area is arranged in the emulator or a predetermined recording medium connected to the emulator, for a specific circuit formed based on the hardware design information, and the event requests a data readout from the virtual area.

5. The associated development support apparatus according to claim 2, wherein the emulator control unit acquires, from the emulator, timing information based on the hardware design information, and generates a write signal for a write operation into a virtual area according to the timing information and the event which is recognized based on analysis of the event information, when the virtual area is arranged in the emulator or a predetermined recording medium connected to the emulator, for a specific circuit formed based on the hardware design information, and the event requests a data write into the virtual area.

6. The associated development support apparatus according to claim 2, wherein when the event generated in the debugger requests a data readout from an area which is defined by the hardware design information as a register area, and a virtual register area corresponding to the register area is virtually arranged in the emulator or a predetermined recording medium connected to the emulator, the emulator control unit performs a readout operation in the virtual register area according to the event, and sends to the debugger data which is read out from the virtual register area.

7. The associated development support apparatus according to claim 2, wherein when the event generated in the debugger requests a data write into an area which is defined by the hardware design information as a register area, and a virtual register area corresponding to the register area is virtually arranged in the emulator or a predetermined recording medium connected to the emulator, the emulator control unit acquires, from the emulator, timing information for a write operation into the register area based on the hardware design information, and performs a write operation into the virtual register area at a timing of writing into the register area which is obtained from the timing information.

8. The associated development support apparatus according to claim 2, wherein when the event generated in the debugger requests a data readout from an area which is defined by the hardware design information as a memory area, and a virtual memory area corresponding to the memory area is virtually arranged in the emulator or a predetermined recording medium connected to the emulator, the emulator control unit performs a readout operation in the virtual memory area according to the event, and sends to the debugger data which is read out from the virtual memory area.

9. The associated development support apparatus according to claim 2, wherein when the event generated in the debugger requests a data write into an area which is defined by the hardware design information as a memory area, and a virtual memory area corresponding to the memory area is virtually arranged in the emulator or a predetermined recording medium connected to the emulator, the emulator control unit acquires, from the emulator, timing information for a write operation into the memory area based on the hardware design information, and performs a write operation into the virtual memory area at a timing of writing into the memory area which is obtained from the timing information.

10. The associated development support apparatus according to claim 2, wherein when the event generated in the debugger requests a data readout from an area which is defined by the hardware design information as an internal-node area, and a virtual internal-node area corresponding to the internal-node area is virtually arranged in the emulator or a predetermined recording medium connected to the emulator, the emulator control unit performs a readout operation in the virtual internal-node area according to the event, and sends to the debugger data which is read out from the virtual internal-node area.

11. The associated development support apparatus according to claim 2, further comprising a code conversion unit which acquires an instruction code of the computer program which is set by the debugger, and converts the instruction code into a mnemonic code.

12. The associated development support apparatus according to claim 2, wherein the emulator emulates timings including signal propagation delay times in the specific circuit based on the hardware design information.

13. The associated development support apparatus according to claim 12, wherein the signal propagation delay times are associated with at least one of access to a memory area, access to a register area and access to a internal node.

14. An associated development support apparatus for a semiconductor device having a central processing unit (CPU) core, comprising:
a CPU;
a memory which stores hardware design information defining a hardware design of a specific circuit and a timing of a signal of the specific circuit;
a communication control unit which controls communication with a debugger, which debugs a computer program that is to be embedded in the semiconductor device or an apparatus incorporating the semiconductor device, and transmits event information generated in the debugger, and notifies the debugger of results of the event, wherein the debugger debugs the computer program based on timings equivalent to the timings in the specific circuit based on the hardware design information;

an emulator which emulates operations of the semiconductor device; and an emulator control unit which acquires from the communication control unit the event information, controls the emulator according to the event information, and transmits to the debugger results of the event associated with operations of the semiconductor device emulated by the emulator;

wherein the emulator control unit writes data according to the event information into a memory area in the emulator at a first timing from outside of the emulator, the first timing being different from a second timing of writing data into the memory area by the emulator, the first timing and the second timing synchronizing with a rising edge or a falling edge of a clock signal.

15. The associated development support apparatus according to claim 14, wherein the emulator emulates timing including signal propagation delay times in the specific circuit based on the hardware design information.

16. The associated development support apparatus according to claim 15, wherein the signal propagation delay times are associated with at least one of access to a memory area, access to a register area and access to a internal node.

* * * * *